Sept. 17, 1963  H. SALMEN  3,103,948
STOPCOCK
Filed Aug. 14, 1961  2 Sheets-Sheet 1

HUBERT SALMEN
*INVENTOR*

BY
*Karl F. Ross*
AGENT

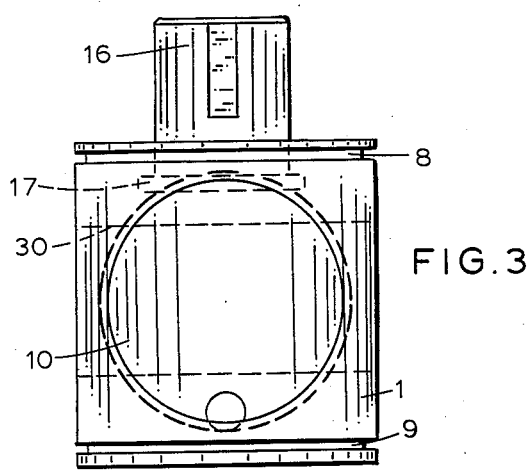
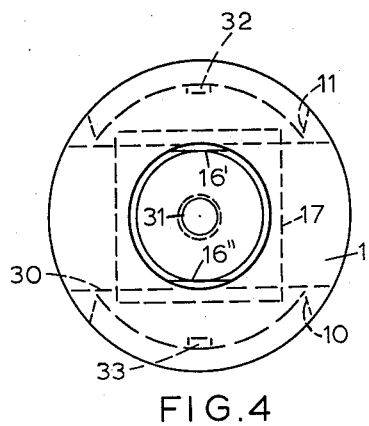
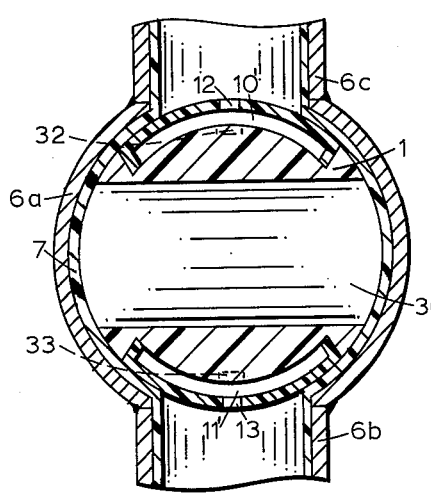

United States Patent Office 3,103,948
Patented Sept. 17, 1963

3,103,948
STOPCOCK
Hubert Salmen, Tilsiter Str. 30, Gladbeck, Germany
Filed Aug. 14, 1961, Ser. No. 138,210
Claims priority, application Germany Aug. 12, 1960
8 Claims. (Cl. 137—375)

The instant invention relates to stopcocks, valves and the like for controlling the flow of fluid through a conduit therefore and has as its principal object the provision of an improved stopcock of relatively inexpensive construction.

Many types of stopcocks, shut-off and flow-control valves and the like have been employed heretofore, their use generally being accompanied by disadvantages which limited their applicability to different flow-control requirements. Such stopcocks usually were provided with a rotatable cylindrical plug or valve member formed with a bore extending transversely to its axis of rotation and surrounded by a housing generally of cast metal. Both the valve member and the valve seat of the housing were ground to effect a close fit, necessitating an expensive machining operation especially if the stopcock was intended for use in regulating the flow of corrosive fluids (e.g. acids and bases) in which case the complementarily ground surfaces were often readily erodable, thereby requiring replacement of the parts of the stopcock. To avoid the corrosive effects of such liquids, the parts of the stopcock were manufactured from expensive metals, such as stainless steel, often without, however, effectively preventing the disadvantageous corrosion of the mating valve surfaces.

It is, therefore, a more specific object of the present invention to provide a stopcock suitable for use with corrosive fluids without, however, requiring the employment of expensive corrosion-resistant metals.

A further object of the invention is to provide a stopcock of relatively inexpensive manufacture obviating the need for complicated machining of the parts thereof.

These objects are achieved, in accordance with the instant invention, by forming the rotatable, generally cylindrical valve member of a stopcock from a corrosion-resistant synthetic resin (e.g. polyester, polyvinylchloride, polytetrafluoroethylene or a like polymeric resin). The valve member is formed with a passage extending generally transversely to its axis of rotation and with a pair of axially spaced annular sealing means on opposite sides of the passage in all-around engagement with the valve housing. According to a more specific feature of the invention, the valve member is formed with at least one recess angularly offset from the aforementioned passage and alignable with an opening in the valve housing through which the controlled fluid is adapted to pass, the recess receiving a packing member (e.g. in the form of a disk) having an annular sealing surface engageable with the housing along the edge of the opening therein to seal the latter upon angular displacement of the valve member into the closed position.

Advantageously, the packing member is apertured to admit the controlled fluid to the recess whereby the packing member is urged by the pressure of the fluid into sealing engagement with the valve housing and, preferably, with the recess walls. To this end, the packing disk is formed with an effective surface, exposed to the fluid in the recess, whose area is larger than that of an opposing surface of the disk exposed to the fluid in the region of the opening in the housing whereby the pressure of the fluid functions similarly to fluid pressure in a differential piston to bias the disk sealingly against the valve housing and its rotary member. Whereas it is generally sufficient to provide packing means of the character described to seal only the fluid-inlet opening of the valve, it will often be found to be preferable to provide two such packing disks, e.g. at diametrically opposite locations on the rotatable valve member, to seal both the fluid-inlet and the fluid-outlet openings.

According to a further feature of the invention, the interior surfaces of the valve housing are clad with a corrosion-resistant layer of synthetic resin, which may or may not be identical with the synthetic resin composing the valve member, preferably of the self-hardening or thermally hardening type (say, for example, hardenable polyvinylchloride or a polytetrafluoroethylene, the latter being generally referred to by the trade name "Teflon").

The cylindrical valve member, composed of a corrosion-resistant polymeric material as mentioned above, may be formed with a projecting portion extending outwardly of the valve housing and adapted to receive a handle or the like whereby the valve member may be rotated relatively to the housing. Advantageously, this projecting portion extends axially outwardly of the valve member through a cover plate of the housing, which may form a bearing for the rotatable member, and is formed from a material (e.g. a metal) whose mechanical wear-resistance is substantially greater than that of the synthetic resin constituting the body of the valve member. The projection thus may be set into the body of the valve member or cast into it, thereby assuring a substantially rigid bond between the body and the projection as well as a positive engagement between them. Since the aforementioned annular sealing members prevent any leakage from the stopcock, the housing of the latter does not require any machining and may, therefore, be comprised by a cylindrically tubular main portion (e.g. a short section of pipe) coaxial with the rotatable member and a pair of tubular portions, whose axes extend transversely to that of the main portion, rigid therewith and respectively forming the inlet and outlet conduits of the stopcock. To limit axial displacement of the rotatable member within the main cylindrical portion of the valve housing, the latter may be provided with a bottom and/or top cover plate, extending generally transversely to the axis of rotation, and abutting respective surfaces of the rotatable member. The mutually abutting surfaces of the plate and the rotatable member is, advantageously, limited to an annular fraction of the total juxtaposed surface area (e.g. by recessing one or both of these surfaces), thereby reducing the frictional forces acting upon the rotatable member to facilitate its actuation. A stopcock constructed in accordance with the invention is relatively inexpensive and yet particularly suitable for use with corrosive fluids.

The above and other objects, features and advantages of the instant invention will become more readily apparent from the following description, reference being made to the accompanying drawing in which:

FIG. 3 is an elevational view of the rotatable valve member of the stopcock;

FIG. 4 is a plan view of the stopcock; and

FIG. 5 is a cross-sectional view taken along line V—V of FIG. 1.

Figure 1:
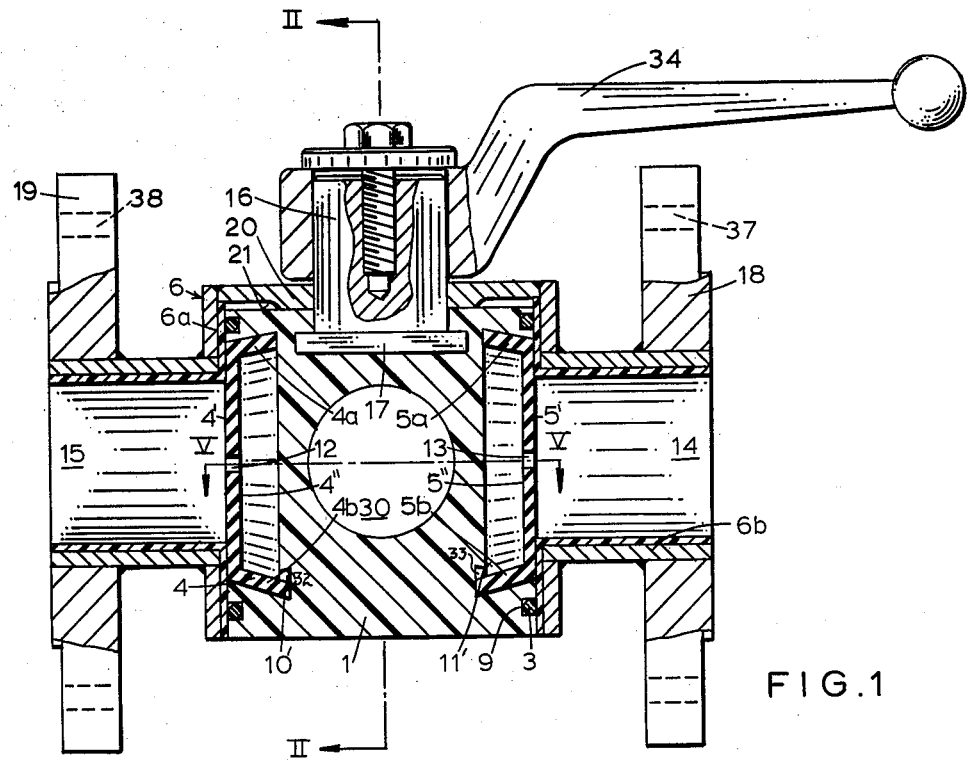
FIG. 1 is an axial cross-sectional view of a stopcock, according to the invention.
Figure 2:
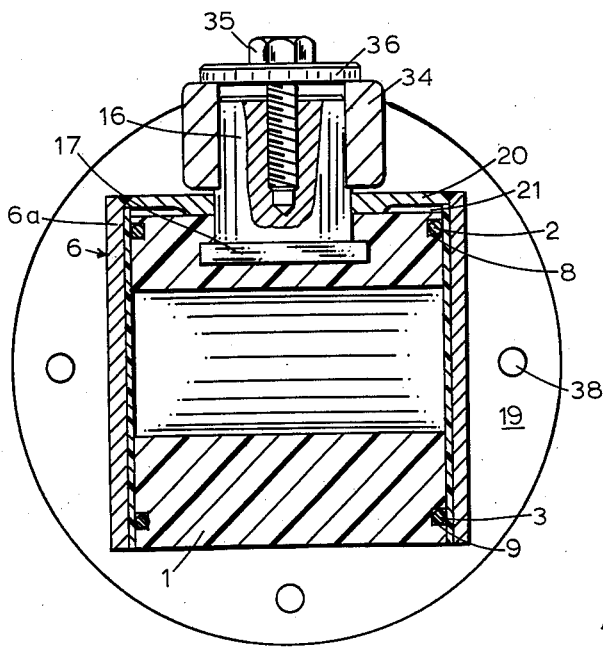
FIG. 2 is a cross-sectional view taken along line II—II of FIG. 1.

In the stopcock illustrated by way of example in the drawing, a cylindrical valve member 1, formed from a corrosion-resistant organic polymer such as a polyester, polyvinylchloride, polytetrafluoroethylene or other hardenable synthetic resin, is provided with a pair of circumferential grooves 8 and 9, axially spaced on opposite sides of a bore 30 extending transversely to the axis of the valve member, adapted to receive respective resilient sealing rings 2 and 3. The latter are, preferably, O-rings and bear upon the internal surface of a pipe section 6a which constitutes the main portion of the stopcock housing 6, coaxial with the rotatable member 1. While the O-rings 2 and 3 may be formed from one of the aforementioned synthetic resins, which are particularly suitable for use in forming the rotatable member 1, it should be understood that they may also be composed of another flexible, corrosion-resistant material (e.g. rubber). The housing 6 also comprises a pair of pipe sections 6b and 6c, whose common axis extends generally transversely to the axis of rotation of the valve member 1, disposed on diametrically opposite sides of the central housing portion 6a and forming the fluid-inlet and fluid-outlet passages 14 and 15, respectively, which register with the bore 30 of member 1 in the open position of the valve.

The valve member 1 is also provided with a pair of diametrically opposite recesses 10 and 11, offset angularly by about 90° from the bore 30, of truncated conical configuration, which are adapted to receive respective packing disks 4 and 5 of similar configuration. The packing disks 4 and 5 are formed of corrosion-resistant flexible gasket material with annular outer surfaces 4′ and 5′ of greater cross-sectional area than the passages 15 and 14, whose peripheral edges they overlie and are adapted to seal. The inner surfaces 4″ and 5″ of the disks define with the walls of their respective recesses a pair of chambers 10′ and 11′ whose lateral walls are formed by the annular wall portions 4a and 5a of the disks. The latter are also provided with respective protuberances 4b and 5b engageable with disk-positioning depressions 32 and 33. The cross-sectional areas of the inner wall portions 4″, 4a and 5″, 5a of the disks 4 and 5 are greater than the external cross-sectional areas exposed to the pressure of the fluid upon the angular displacement of valve member 1 through about 90° into the close position of the stopcock wherein the disks 4 and 5 overlie the apertures of passages 15 and 14 (FIGS. 1 and 5). The disks 4 and 5 are provided with respective perforations 12 and 13 whereby the pressure of the fluid is communicated, in the closed position, to the chambers 10′ and 11′ and, owing to the relationship of the effective cross-sectional areas of the surfaces of the disks described above, biases the packing disks outwardly against the lateral walls of the recesses 10 and 11 as well as against the annular edges of the passages 14 and 15, thereby sealing completely these passages in the close position of the stopcock.

To facilitate rotation of the valve member 1, the latter is provided with an axial extension 16, whose base 17 is of square configuration and is embedded in the body of the valve member 1 and forms a positive engagement therewith, projecting through a cover plate 20 of housing 6. The extension 16 is flattened at diametrically opposite locations 16′, 16″ to receive the hub of an actuating handle 34 adapted to rotate the valve member 1. The handle 34 is secured to the extension 16 by a screw 35, threadedly received in an axial bore 31 of the extension, whose washer 36 bears upon the hub. The surface of cover plate 20 which may, like the extension 16 and the housing portions 6a, 6b and 6c, be formed from a metal such as steel, juxtaposed with the upper surface of the cylindrical member 1, is recessed annularly at 21 to limit the frictional engagement of the valve member by the housing. The internal surfaces of the latter are provided with a polymeric corrosion-resistant layer 7, as best illustrated in FIG. 5, to obviate erosion of these surfaces when the stopcock is employed with corrosive fluids. The inlet and outlet tubes 6b and 6a of housing 6 are provided with annular flanges 18 and 19, formed with angularly spaced bores 37 and 38, whereby the stopcock may be bolted or otherwise connected into a fluid line. The parts of the housing 6 may be welded together, thereby eliminating the need for complicated and expensive castings.

The invention as described and illustrated is believed to admit of many modifications and variations which will be readily apparent to persons skilled in the art and are intended to be included within the spirit and scope of the invention as claimed.

I claim:
1. A stopcock comprising a housing, a valve member rotatable within said housing about an axis, said housing being formed with a fluid-inlet opening and a fluid-outlet opening angularly offset from said inlet opening, said valve member having a passage extending generally transversely to said axis communicating between said inlet opening and said outlet opening in a first angular position of said member and blocking at least one of said openings in a second angular position thereof relative to said housing, and a pair of axially spaced annular sealing members on opposite sides of said passage in all-around engagement with said valve member and said housing, said valve member being of generally cylindrical configuration rotatable about its axis and being provided with a pair of circumferential grooves axially spaced on opposite sides of said passage, said annular sealing members constituting resiliently compressible O-rings respectively inserted in said grooves and bearing upon said housing, said valve member being formed with a recess of truncated conical configuration alignable with at least one of said openings in said second angular position of said valve member, further comprising packing means in said recess bearing annularly upon said housing along the periphery of said opening, said packing means including a disk of flexible material having a wall portion in annular engagement with an outwardly converging wall portion of said recess and forming with said valve member a chamber whose cross-sectional area is greater than that of said one opening, said disk being provided with an aperture communicating between said one opening and said chamber, whereby the pressure of a fluid admitted to said chamber via said aperture biases said disk against said housing.

2. A stopcock according to claim 1 wherein said valve member is composed of a corrosion-resistant synthetic resin.

3. A stopcock according to claim 1 wherein said synthetic resin is selected from the group of polymeric substances which consists of polyester, polyvinylchloride and polytetrafluoroethylene resins.

4. A stopcock according to claim 1 wherein said housing is lined with a corrosion-resistant synthetic resin.

5. A stopcock according to claim 1 wherein said openings are substantially diametrically opposite each other, said passage extending along a diameter of said valve member, said recess being offset angularly from said passage by approximately 90°.

6. A stopcock according to claim 1 wherein said housing includes a tubular main portion coaxially surrounding said valve member, and a pair of auxiliary tubular portions extending transversely to said main portion and respectively forming said openings.

7. A stopcock according to claim 6 wherein said main portion is formed with a cover plate having a surface extending transversely to said axis and juxtaposed with a transverse surface of said valve member in contact therewith at one extremity thereof.

8. A stopcock comprising a housing forming a generally cylindrical metallic valve body lined with a corrosion-resistant synthetic resin, a generally cylindrical valve member composed of a corrosion resistant synthetic resin rotatable within said body about the axis of said body, said housing being formed with a fluid-inlet opening and a fluid-outlet opening angularly offset from said inlet opening, said valve member having a passage extending generally transversely to said axis communicating between said inlet opening and said outlet opening in a first angular position of said member and blocking at least one of said openings in a second angular position thereof relative to said housing, said member being provided with a pair of recesses respectively alignable with said openings in said second angular position of said member, a respective flexible sealing disk seated in each of said recesses and bearing annularly on said body around each opening in the second position of said member, said valve member being provided with a pair of circumferential grooves axially spaced on opposite sides of said passage and said sealing discs, and resiliently compressible O-rings respectively inserted in said grooves and bearing upon the synthetic resin lining of said body in all-around engagement with said valve member and said body.

References Cited in the file of this patent

UNITED STATES PATENTS

| | | |
|---|---|---|
| 731,220 | Quin | June 16, 1903 |
| 1,827,266 | Shipley | Oct. 13, 1931 |
| 1,872,417 | Dalldorf | Aug. 16, 1932 |
| 2,615,672 | Hinrichs | Oct. 28, 1952 |
| 2,641,278 | Eplett | June 9, 1953 |
| 2,696,968 | Fillips | Dec. 14, 1954 |
| 2,844,353 | Gurries | July 22, 1958 |

FOREIGN PATENTS

| | | |
|---|---|---|
| 184,911 | Great Britain | Aug. 31, 1922 |
| 506,249 | Italy | Dec. 21, 1954 |
| 1,120,110 | France | Apr. 16, 1956 |